US007985495B2

(12) United States Patent
Okada et al.

(10) Patent No.: US 7,985,495 B2
(45) Date of Patent: Jul. 26, 2011

(54) ASSEMBLED BATTERY, POWER-SUPPLY SYSTEM AND PRODUCTION METHOD OF ASSEMBLED BATTERY

(75) Inventors: Yukihiro Okada, Osaka (JP); Masatoshi Nagayama, Osaka (JP)

(73) Assignee: Panasonic Corporation, Osaka (JP)

( * ) Notice: Subject to any disclaimer, the term of this patent is extended or adjusted under 35 U.S.C. 154(b) by 1225 days.

(21) Appl. No.: 11/654,682

(22) Filed: Jan. 18, 2007

(65) Prior Publication Data

US 2007/0166607 A1 Jul. 19, 2007

(30) Foreign Application Priority Data

Jan. 18, 2006 (JP) ................................ 2006-009504

(51) Int. Cl.
*H01M 12/00* (2006.01)
*H01M 10/48* (2006.01)
*H01M 4/13* (2006.01)

(52) U.S. Cl. ........... 429/9; 429/90; 429/156; 429/231.3; 429/224

(58) Field of Classification Search ................ 429/9, 90, 429/156, 7, 231.8, 231.1, 223, 231.3, 231.6, 429/224
See application file for complete search history.

(56) References Cited

U.S. PATENT DOCUMENTS

2005/0216212 A1* 9/2005 Syracuse et al. ................ 702/63
2006/0216612 A1* 9/2006 Jambunathan et al. ....... 429/326

FOREIGN PATENT DOCUMENTS

JP 9-180768 7/1997
JP 2000-21455 1/2000

* cited by examiner

*Primary Examiner* — Patrick Joseph Ryan
*Assistant Examiner* — Muhammad Siddiquee
(74) *Attorney, Agent, or Firm* — McDermott Will & Emery LLP

(57) ABSTRACT

An assembled battery comprises mainly multiple non-aqueous secondary cells A and at least one electric device B for voltage detection containing a non-aqueous electrolyte connected to the multiple non-aqueous secondary cells A in series. When a difference in the non-aqueous secondary cell A between a voltage per cell ($V_{A1}$) at a depth of discharge of 25% and a voltage per cell ($V_{A2}$) at a depth of discharge of 75% is designated as $\Delta V_A$, and a difference in the electric device B between a voltage per cell ($V_{B1}$) at a depth of discharge equivalent to the depth of discharge of 25% of the non-aqueous secondary cell A and a voltage per cell ($V_{B2}$) at a depth of discharge equivalent to the depth of discharge of 75% of the non-aqueous secondary cell A is designated as $\Delta V_B$, the $\Delta V_B$ of electric device B is greater than the $\Delta V_A$ of non-aqueous secondary cell A.

9 Claims, 4 Drawing Sheets

ASSEMBLED BATTERY, POWER-SUPPLY SYSTEM AND PRODUCTION METHOD OF ASSEMBLED BATTERY

BACKGROUND OF THE INVENTION

1. Field of the Invention

The present invention relates to an assembled battery having multiple cells connected in series, a power-supply system using the same, and a method of producing the assembled battery.

2. Description of the Related Art

Recently, assembled batteries having multiple cells connected have been used in large-scale power-supply systems used, for example, in electric vehicle, hybrid electric vehicle, and home, to obtain desirable power. Non-aqueous secondary cells such as lithium-ion secondary cell and lithium polymer secondary cell, which are light and higher in capacity and power, are attracting attention as a battery for the large-scale power-supply systems.

The battery for use in such an application as large-scale power-supply system is preferably a battery that can be operated at a wider depth of charge and discharge, and large fluctuation of its power is undesirable for stabilized supply of power.

The power of battery is calculated by (voltage of battery)×(current), or (voltage)×(voltage)÷(internal resistance of battery), and thus, depends largely on the voltage or internal resistance of the battery. Non-aqueous secondary cells including lithium-ion secondary cell generally have a higher battery voltage and a lower internal resistance when the depth of charge is greater or the depth of discharge is smaller. On the contrary, when the depth of charge is smaller or the depth of discharge is greater, the battery voltage becomes lower and the battery internal resistance greater. Thus, by reducing the difference in battery voltage or internal resistance caused by depth of charge and discharge, it is possible to reduce the power fluctuation even when the cell is operated at a wide range of depth of charge and discharge.

When multiple non-aqueous secondary cells are connected and used as an assembled battery, the cell is operated at a middle range of depth of charge and discharge, in order, during discharge, to ensure discharge reserve for preventing overdischarge of a cell having a smaller capacity due to fluctuation in capacity of each cell and in order, during charge, to prevent deterioration of a cell due to phase change of a positive-electrode active material by high voltage. For example, in a common lithium-ion secondary cell employing a cobalt-based oxide as a positive-electrode active material and graphite as a negative-electrode active material, use in a depth of charge and discharge in the regions close to the upper and lower limits is avoided, and instead, the used region of the depth of charge and discharge is normally in the range of 25 to 75% excluding about 25% range respectively in the upper and lower limits of depth of charge and discharge.

Methods of integrating battery temperature or current, for example, are known as the method of determining the depth of charge and discharge of such a secondary cell. However, these methods often cause error during long-term use, and for that reason, it is also determined from the battery voltage or internal resistance. The internal resistance is determined from the change in the current ΔI flowing in battery and the change in the voltage ΔV of battery, according to the Formula: [Internal resistance=ΔV/ΔI].

On the contrary to the case for reduction of power fluctuation, when the depth of charge and discharge is to be determined from the battery voltage or internal resistance, the battery voltage or internal resistance preferably varies according to the depth of charge and discharge in the region of the depth of charge and discharge used. However, it is difficult to determine the depth of charge and discharge from battery voltage or internal resistance, when a non-aqueous secondary cell, which shows a smaller change in voltage or internal resistance, is used. In particular, non-aqueous secondary cells employing a 5V-class spinel lithium manganese oxide $LiNi_{0.5}Mn_{1.5}O_4$ or an iron phosphate compound as the positive-electrode active material have a very flat charge/discharge curve, flatter than that employing conventional positive-electrode active materials, and thus, are highly expected as a battery with smaller power fluctuation. Thus, an assembled battery comprising non-aqueous secondary cells containing such a positive-electrode active material shows smaller power fluctuation in a wider range of depth of charge and discharge and is superior in stability, but it becomes more difficult to determine the depth of charge and discharge by a method of detecting the voltage or internal resistance of battery.

Generally when a non-aqueous secondary cell is used to the region smaller or greater in the depth of charge and discharge, detection of the voltage or internal resistance of battery may become easier, but practically, the battery is not always used to both limits of the depth of charge and discharge. In addition, in an assembled battery including multiple cells, part of the cells may be overcharged or overdischarged, because of fluctuation in capacity of the cells. For that reason, use of the battery to the regions smaller and greater in depth of charge and discharge is undesirable. A detection circuit may be installed for each cell in the assembled battery for accurate detection of the voltage or internal resistance of the cell, but such a method makes the apparatus more complicated and demands a high-accuracy detection element, causing a problem of increase in production cost.

Accordingly, there are some methods proposed for such assembled batteries in which multiple non-aqueous secondary cells are connected. For example, Patent Document 1, Japanese Unexamined Patent Publication No. 9-180768, proposes a method of using an assembled battery containing mainly non-aqueous secondary cells and an aqueous-solution secondary cell, such as nickel metal-hydride cell, having a capacity smaller than that of the non-aqueous secondary cells connected thereto. In the assembled battery, charging of the non-aqueous secondary cell is terminated before it is overcharged, because the late charging state is detected by the aqueous-solution secondary cell having a smaller capacity. In addition, the aqueous-solution secondary cell shows a characteristic voltage phenomenon different from that of a non-aqueous secondary cell in the late charging state, allowing determination of the depth of charge of the entire assembled battery only by determining the voltage of the aqueous-solution secondary cell.

However, the assembled battery disclosed in Patent Document 1 has a problem that the relationship between the setup depth of charge and discharge and the voltage varies gradually during use.

Specifically, the method of voltage detection disclosed in Patent Document 1, which is aimed at measuring the large voltage change occurring at the end of charging in an aqueous-solution secondary cell, allows detection of voltage in the late charging state. However, in aqueous-solution secondary cells, the charge current flowing in the overcharge range is not used for charging, but used for electrolysis of water in the electrolytic solution, and non-aqueous secondary cells, which are not charged completely, remain to be charged, even when the aqueous-solution secondary cell is overcharged. In addition, in aqueous-solution secondary cells, part of the charge current is not used for charging but used for electrolysis of water also in the normal use region, for example, when large charge current flows or the environment temperature is high. Accordingly, even when the assembled battery is produced in such a setting that the uncharged state of an aqueous-solution secondary cell and the uncharged state of a non-aqueous secondary cell are harmonized, the relationship between the depth of charge and discharge of the aqueous-solution secondary cell and that of the non-aqueous secondary cell varies soon relatively easily. In particular, in the assembled battery of Patent Document 1, in which the capacity of the aqueous-solution secondary cell is made smaller than that of the non-aqueous secondary cell, the aqueous-solution secondary cell is always charged to the overcharge region, which may result in deterioration in capacity, and the deterioration in capacity also leads to deviation of the depth of charge and discharge. It also causes a problem of impairing the function to control charge and discharge of the entire assembled battery while predicting the charge state of the non-aqueous secondary cell by using the voltage drop occurring when the aqueous-solution secondary cell is charged completely.

It is occasionally difficult to detect the depth of charge and discharge from battery voltage, depending on the condition of battery operation. For example, when a battery is always in operation of supplying current, the voltage varies according to the intensity of the current, resulting in inconsistency between the battery voltage and the depth of charge and discharge. For example, Patent Document 2, Japanese Unexamined Patent Publication No. 2000-21455, proposes a method of measuring the current and voltage of a battery, determining the internal resistance of the battery from the observed values, and thereby, correlating the internal resistance with the depth of charge and discharge of the battery.

The method of correlating the internal resistance with the depth of charge and discharge of a battery disclosed in Patent Document 2 allows easy detection of the depth of charge and discharge if the battery used is a battery having a large internal resistance. However, it is difficult to determine the depth of charge and discharge from the internal resistance, when non-aqueous secondary cell having very small change in battery internal resistance, which is favorable as a power source in power-supply system, is used. In particular, in the case of a non-aqueous secondary cell employing a 5V-class spinel lithium manganese oxide $LiNi_{0.5}Mn_{1.5}O_4$ or an iron phosphate compound as the positive-electrode active material, the method of detecting battery internal resistance causes a problem of difficulty in determining the depth of charge and discharge, because such a cell shows an internal resistance change by depth of charge and discharge smaller than that of the non-aqueous secondary cell employing a conventional positive-electrode active material such as nickel oxide or cobalt oxide.

SUMMARY OF THE INVENTION

In view of the above problems residing in the prior art, it is an object of the present invention to provide an assembled battery, for use in a large-scale power-supply system, containing multiple non-aqueous secondary cells mainly which enables to supply high power consistently and to prevent overcharge and overdischarge effectively by detecting the depth of charge and discharge of the assembled battery accurately, without making the apparatus more complicated, and thus, to enhance the reliability of the assembled battery.

An aspect of the invention is directed to an assembled battery, comprising mainly multiple non-aqueous secondary cells A and at least one electric device B for voltage detection containing a non-aqueous electrolyte connected to the multiple non-aqueous secondary cells A in series, wherein, when a difference in the non-aqueous secondary cell A between a voltage per cell ($V_{A1}$) at a depth of discharge of 25% and a voltage per cell ($V_{A2}$) at a depth of discharge of 75% is designated as $\Delta V_A$, and a difference in the electric device B between a voltage per cell ($V_{B1}$) at a depth of discharge equivalent to the depth of discharge of 25% of the non-aqueous secondary cell A and a voltage per cell ($V_{B2}$) at a depth of discharge equivalent to the depth of discharge of 75% of the non-aqueous secondary cell A, as $\Delta V_B$, the $\Delta V_B$ of electric device B is greater than the $\Delta V_A$ of non-aqueous secondary cell A.

Another aspect of the invention is directed to an assembled battery, comprising mainly multiple non-aqueous secondary cells A and at least one electric device D for internal-resistance detection containing a non-aqueous electrolyte connected to the multiple non-aqueous secondary cells A in series, wherein, when a difference in the non-aqueous secondary cell A between an internal resistance per cell ($R_{A1}$) at a depth of discharge of 25% and an internal resistance per cell ($R_{A2}$) at a depth of discharge of 75% is designated as $\Delta R_A$, and a difference in the electric device D between an internal resistance per cell ($R_{D1}$) at a depth of discharge equivalent to the depth of discharge of 25% of the non-aqueous secondary cell A and an internal resistance per cell ($R_{D2}$) at a depth of discharge equivalent to the depth of discharge of 75% of the non-aqueous secondary cell A, as $\Delta R_D$, the $\Delta R_D$ of electric device D is greater than the $\Delta R_A$ of non-aqueous secondary cell A.

These and other objects, features, aspects, and advantages of the present invention will become more apparent upon reading the following detailed description along with the accompanying drawings.

DETAILED DESCRIPTION OF THE PREFERRED EMBODIMENTS

Figure 1:
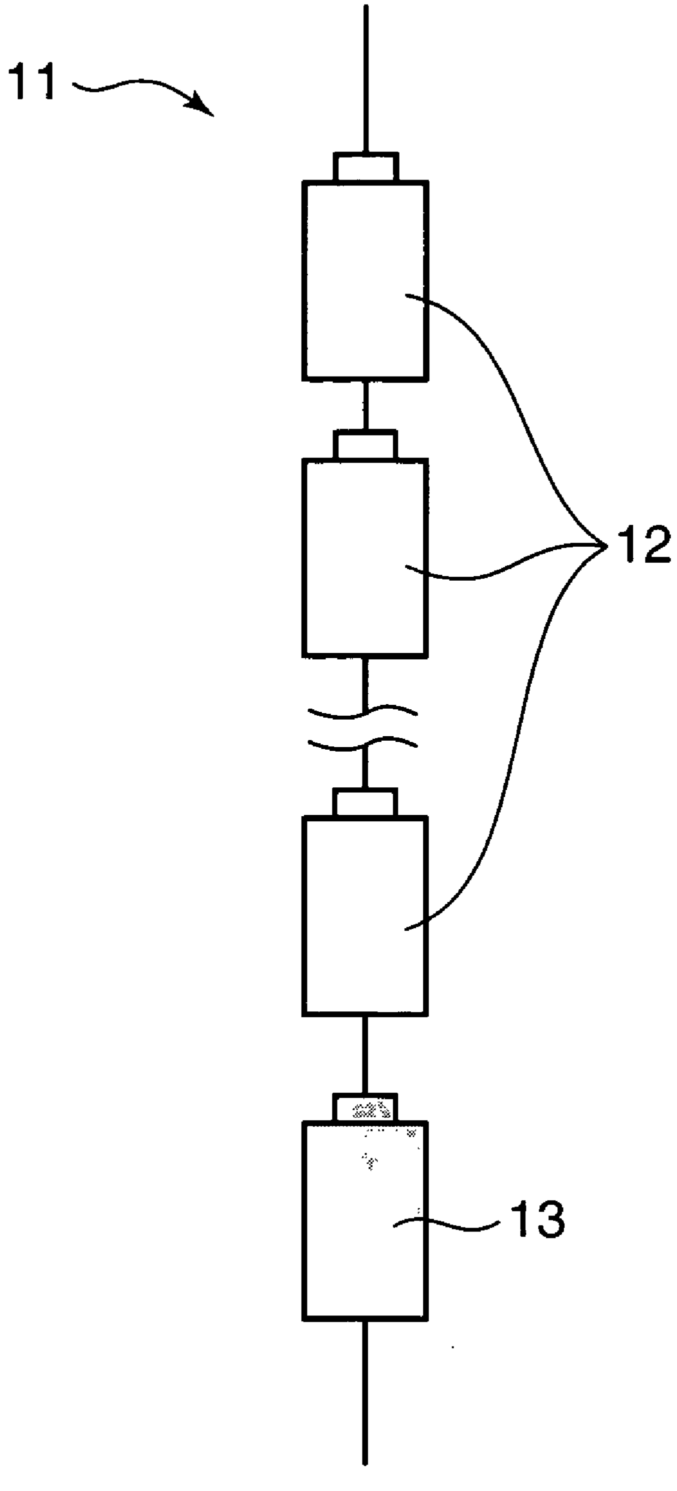
FIG. 1 is a schematic view illustrating an example of the assembled battery according to the present invention.

FIG. 1 is a schematic view illustrating an example of the assembled battery including non-aqueous secondary cells A and a electric device B according to an embodiment of the present invention. The assembled battery (11) shown in FIG. 1 is an assembled battery including multiple non-aqueous secondary cells A (12) and a electric device B or D (13) connected in series. In the embodiment, the order of cell sequence is not particularly limited, if the assembled battery comprises mainly multiple non-aqueous secondary cells A (12) and at least one electric device B or D (13) connected to the non-aqueous secondary cells A in series. For example, the electric device B or D may be connected to the non-aqueous secondary cells A at the terminal of or inside the assembled battery. The assembled battery having the multiple non-aqueous secondary cells A and a electric device B or D connected in series may be connected to each other in parallel. In addition, a cell group containing multiple non-aqueous secondary cells A connected in parallel may be connected to each other in series, and the electric device B or D may be connected to the cell groups in series. Further, two or more electric devices B or D may be connected for improvement in detection accuracy in a large-scale power-supply system in which multiple non-aqueous secondary cells A are used.

The assembled battery according to the embodiment, which is used in a large-scale power-supply system, mainly comprises non-aqueous secondary cells A for the purpose of increasing power. Accordingly, the power and energy density of the entire assembled battery are determined by the power and energy density of each non-aqueous secondary cell A. In the embodiment, because the depth of charge and discharge of the entire assembled battery is detected by the electric device B or D, it is not required to raise the voltage change or the internal-resistance change of the non-aqueous secondary cell A itself in the range of the depth of charge and discharge used. Accordingly, it is possible to use a battery smaller in voltage change or internal-resistance change as the non-aqueous secondary cell A, the main component of the assembled battery, and thus, stabilized power is supplied to devices in a wide range of the depth of charge and discharge.

On the other hand, it is more difficult to detect the depth of charge and discharge from the change in voltage or internal resistance in an assembled battery having only non-aqueous secondary cells A smaller in the voltage change or internal-resistance change. Thus, in the embodiment, for accurate detection of the depth of charge and discharge of the assembled battery and supply of high power, the electric device B containing a non-aqueous electrolyte and having a particular relationship with the non-aqueous secondary cell A is used as a cell for voltage detection, or alternatively, the electric device D containing a non-aqueous electrolyte and having a particular relationship with the non-aqueous secondary cell A is used as a cell for internal-resistance detection, respectively together with the non-aqueous secondary cell A. Specifically, the electric device B for use in the embodiment contains a non-aqueous electrolyte, and, when the difference in the non-aqueous secondary cell A between the voltage per cell ($V_{A1}$) at a depth of discharge of 25% and the voltage per cell ($V_{A2}$) at a depth of discharge of 75% is designated as $\Delta V_A$, and the difference in electric device B between the voltage per cell ($V_{B1}$) at a depth of discharge equivalent to the depth of discharge of 25% of the non-aqueous secondary cell A and the voltage per cell ($V_{B2}$) at a depth of discharge equivalent to the depth of discharge of 75% of the non-aqueous secondary cell A is designated as $\Delta V_B$, the electric device B has the $\Delta V_B$ greater than the $\Delta V_A$ of non-aqueous secondary cell A. Further, the electric device D for use in the embodiment contains a non-aqueous electrolyte, and, when the difference in the non-aqueous secondary cell A between the internal resistance per cell ($R_{A1}$) at a depth of discharge of 25% and the internal resistance per cell ($R_{A2}$) at a depth of discharge of 75% is designated as $\Delta R_A$ and the difference in the electric device D between the internal resistance per cell ($R_{D1}$) at a depth of discharge equivalent to the depth of discharge of 25% of the non-aqueous secondary cell A and the internal resistance per cell ($R_{D2}$) at a depth of discharge equivalent to the depth of discharge of 75% of the non-aqueous secondary cell A is designated as $\Delta R_D$, the electric device D has the $\Delta R_D$ greater than the $\Delta R_A$ of non-aqueous secondary cell A.

It is possible to detect the set depth of charge and discharge accurately by making the $\Delta V_B$ of electric device B greater than $\Delta V_A$ of non-aqueous secondary cell A, even if it is difficult to detect the depth of charge and discharge of a non-aqueous secondary cell A having a smaller voltage change, because the voltage of electric device B decreases or increases continuously in the range of the depth of charge and discharge normally used in the non-aqueous secondary cell A. Accordingly, the voltage of electric device B is detected, instead of the voltage of non-aqueous secondary cell A, and thus, the depth of charge and discharge of the entire assembled battery is detected accurately, and overcharge and overdischarge of the entire assembled battery are prevented effectively. It is also possible to detect the set depth of charge and discharge accurately by making $\Delta R_D$ of electric device D greater than $\Delta R_A$ of non-aqueous secondary cell A, even if it is difficult to detect the depth of charge and discharge of a non-aqueous secondary cell A having a smaller internal-resistance change, because the internal resistance of electric device D decreases or increases continuously in the range of the depth of charge and discharge normally used in the non-aqueous secondary cell A. Accordingly, the internal resistance of electric device D is detected, instead of the internal resistance of non-aqueous secondary cell A, and thus, the depth of charge and discharge of the entire assembled battery is detected accurately and overcharge and overdischarge of the entire assembled battery are prevented effectively. Further, because the electric device B or D according to the embodiment is a cell containing a non-aqueous electrolyte similar to that in the non-aqueous secondary cell A, it is possible to suppress the influence of gas generation even if the capacitor is overcharged or a large current flows therein, and the deviation in the depth of charge and discharge of electric device B or D is reduced.

In the embodiment, the depth of discharge of electric device B or D is made equivalent to the depth of discharge of non-aqueous secondary cell A, because of the following reasons:

Even when a non-aqueous secondary cell similar to the non-aqueous secondary cell A is used as the electric device B or D, some variations may occur between the cells in the relationship between the depth of discharge and voltage or between the depth of discharge and internal resistance.

Figures 2A, 2B, 2C:
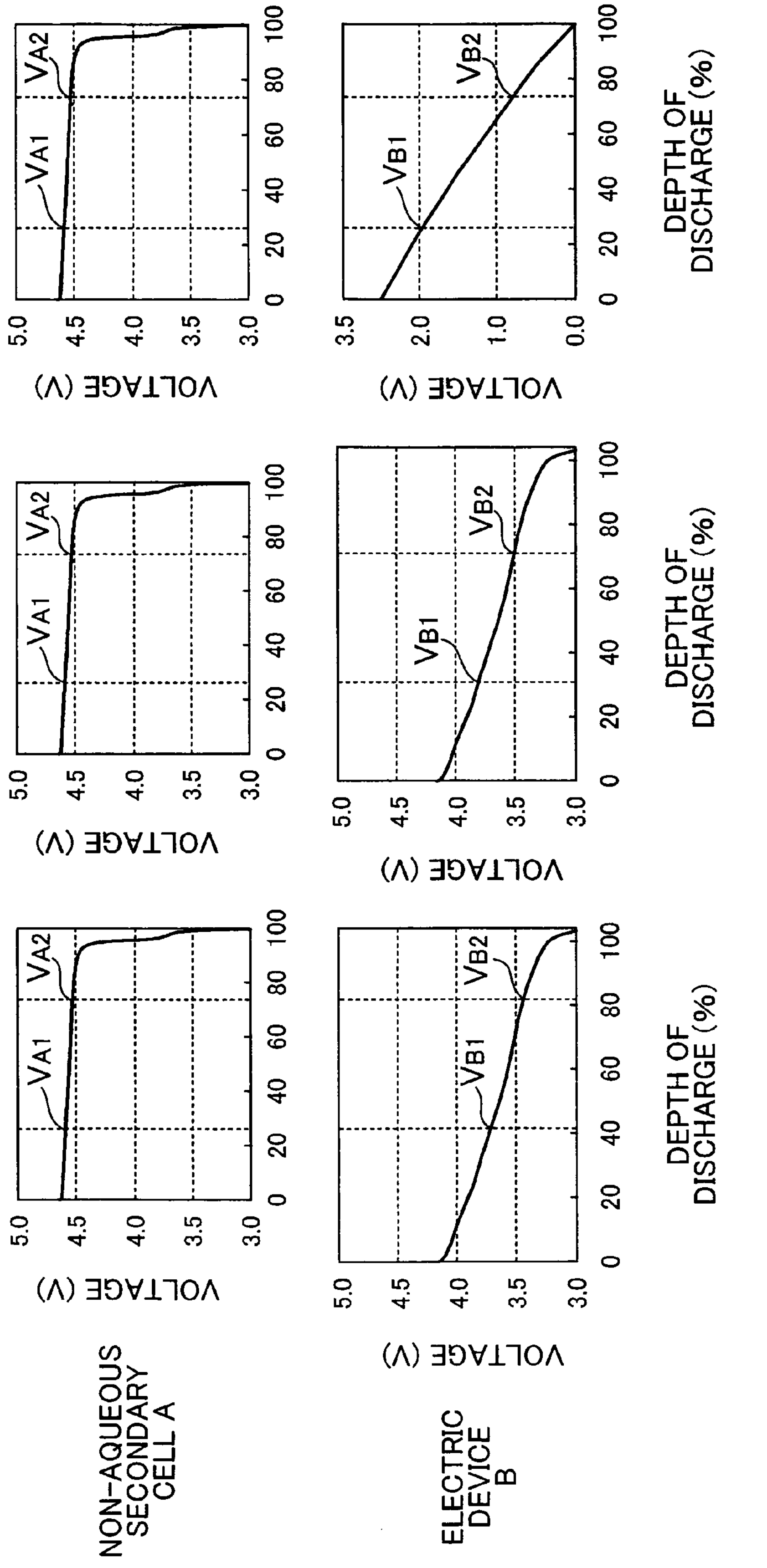
FIG. 2A is a characteristic graph showing an example of the relationship between depth of discharge and voltage in each cell of the non-aqueous secondary cell A and the electric device B according to the present invention, wherein both the non-aqueous secondary cell A and the electric device B are lithium-ion secondary cells.
FIG. 2B is a characteristic graph showing an example of the relationship between depth of discharge and voltage in each cell of the non-aqueous secondary cell A and the electric device B according to the present invention, wherein both the non-aqueous secondary cell A and the electric device B are lithium-ion secondary cells, and the electric device B is preliminarily charged.
FIG. 2C is a characteristic graph showing an example of the relationship between depth of discharge and voltage in each cell of the non-aqueous secondary cell A and the electric device B according to the present invention, wherein the non-aqueous secondary cell A is a lithium-ion secondary cell and the electric device B is an electric double-layer capacitor.
Figure 4:
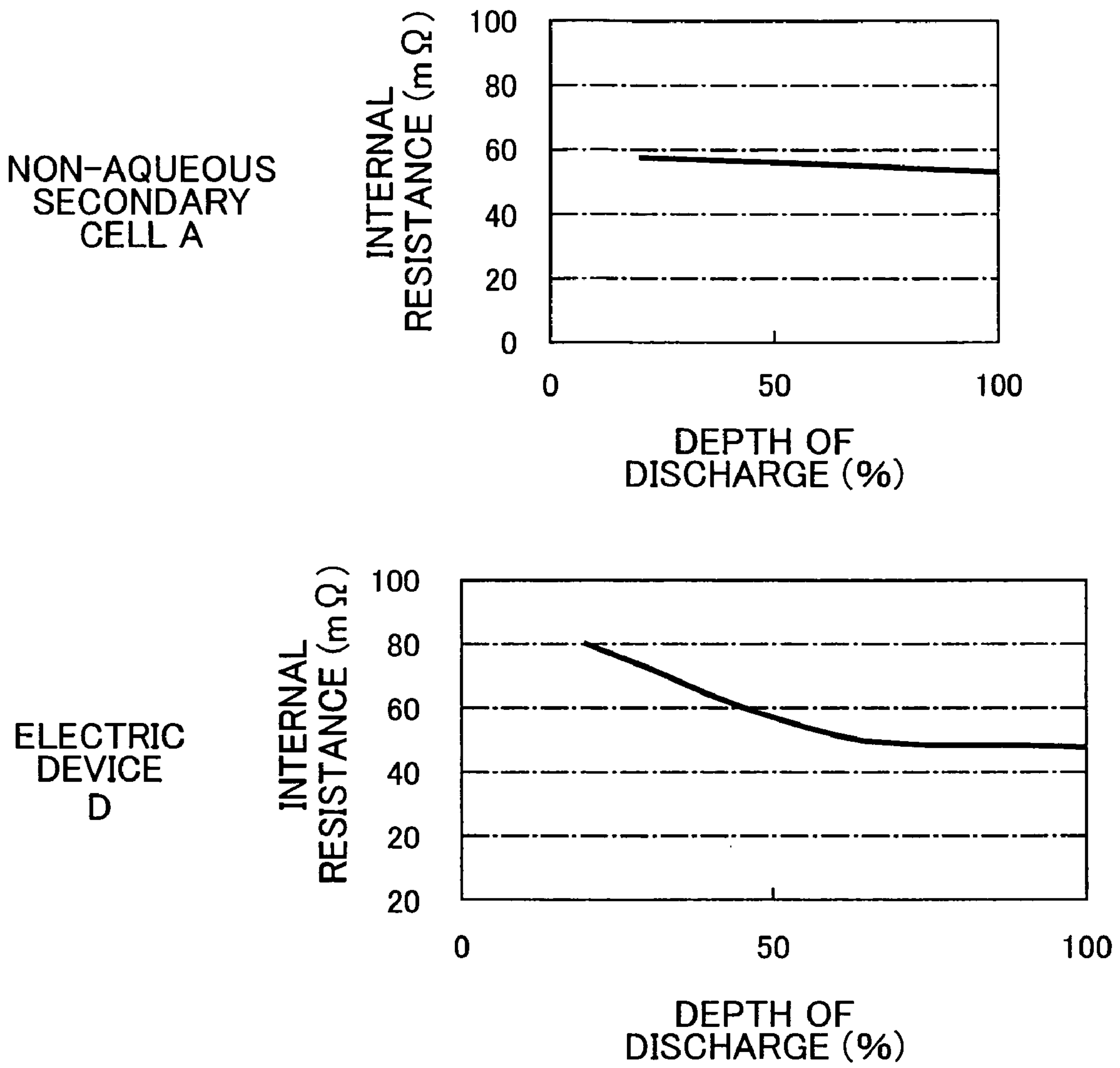
FIG. 4 is a characteristic graph showing an example of the relationship between depth of discharge and internal resistance in each cell of the non-aqueous secondary cell A and the electric device D according to the present invention.

When the capacity of the electric device B or D is greater than that of the non-aqueous secondary cell A, the degree of depth of discharge of non-aqueous secondary cell A is not always identical with the degree of depth of discharge of electric device B or D. For example, FIG. 2A includes a characteristic graph showing an example of the relationship between the depth of discharge and the voltage of each cell of the non-aqueous secondary cell A and the electric device B according to the embodiment. Both cells are lithium-ion secondary cells, but different positive-electrode active materials are used so that the characteristic in the depth of discharge and voltage varies respectively. The non-aqueous secondary cell A in the top graph is a lithium-ion secondary cell having a capacity of 1,000 mAh, while the electric device B in the bottom graph is a lithium-ion secondary cell having a capacity of 1,200 mAh. FIG. 4 includes a graph showing an example of the relationship between the depth of discharge and the internal resistance of each of the non-aqueous secondary cell A and the electric device D according to the embodiment. Both cells are lithium-ion secondary cells, but the non-aqueous secondary cell A in the top graph is a lithium-ion secondary cell having a capacity of 2,000 mAh, while the electric device D in the bottom graph is lithium-ion secondary cell having a capacity of 2,400 mAh. In FIG. 2A or 4, the depth of discharge on the abscissa of the characteristic graph of the electric device B or D respectively in the bottom graphs is elongated more than the depth of discharge of non-aqueous secondary cell A in the top graph, to show that the capacity of the electric device B or D is greater. As shown in these graphs, when the capacity of the electric device B or D is greater than that of the non-aqueous secondary cell A, the 25% and the 75% of the depth of discharge in the electric device B or D do not match respectively the 25% and the 75% of the depth of discharge in the non-aqueous secondary cell A.

Further, in the embodiment, when the capacity of the electric device B or D is greater than that of the non-aqueous secondary cell A, as will be described below, the electric device B or D is preferably charged preliminary to connection to the non-aqueous secondary cell A, and also in such a case, the degree of depth of discharge of electric device B or D does not become identical with the degree of depth of discharge of non-aqueous secondary cell A. For example, FIG. 2B is a characteristic graph in a case that the depth of discharge of electric device B is so adjusted that the central position at a depth of discharge of 50% in each cell of FIG. 2A become identical with each other. In such a case too, the depth of discharge of non-aqueous secondary cell A does not become identical with that of electric device B. In FIG. 4, the electric device D is charged preliminarily prior to connection to the non-aqueous secondary cell A, which also makes the degree of depth of discharge of electric device D different from the degree of depth of discharge of non-aqueous secondary cell A. FIG. 4 is a characteristic graph in a case that the depth of discharge of electric device D is so adjusted that the central point of each cell at a depth of discharge of 50% becomes identical with each other.

Considering that the characteristic between the depth of discharge and voltage of the electric device B or the characteristic between the depth of discharge and internal resistance of the electric device D is respectively different from the characteristic of the non-aqueous secondary cell A, the depth of discharge for detection of the voltage of electric device B or for detection of the internal resistance of electric device D is made equivalent to the depth of discharge of non-aqueous secondary cell A.

In the embodiment, the depth of only discharge is used for comparison, because the depth of discharge of secondary cell is almost reversely parallel with the depth of charge, and the voltage difference or the internal-resistance difference at a depth of discharge is almost identical with the voltage or internal-resistance difference at the depth of charge, and thus, the characteristic of the depth of charge may be regarded as that of the depth of discharge. Accordingly, in selection of the non-aqueous secondary cell A and the electric device B or D according to embodiment, a combination of a non-aqueous secondary cell A and a electric device B, or a combination of a non-aqueous secondary cell A and a electric device D, is selected for production of an assembled battery in such a manner that the relationship between depth of discharge and voltage, or the relationship between depth of discharge and internal resistance, becomes respectively the above-described particular relationship, by measuring the relationship between the depth of discharge and voltage of each cell or the relationship between depth of discharge and internal resistance of each cell. The voltage or internal resistance at a depth of discharge of 25% or 75% is used for comparison, because such a range is frequently used in an assembled battery for use, for example, in electric and hybrid car, and high detection accuracy is required.

The depth of discharge of the non-aqueous secondary cell A in the embodiment is determined as a value relative to the depth of discharge of non-aqueous secondary cell A (0%) in a cut-off voltage of charge at full charge in the initial stage during normal use of the assembled battery, and the depth of discharge of non-aqueous secondary cell A (100%) in a cut-off voltage of discharge at the late discharge state of the assembled battery. Accordingly, a depth of discharge of 25% means the state of a cell when the cell is charged to the cut-off voltage of charge at 0.2 C (5 hour rate) according to the depth of discharge described above and then discharged in an amount equivalent to 25% of the capacity. A depth of discharge of 75% means the state of a cell when the cell is charged to the cut-off voltage of charge at 0.2 C and then discharged in an amount equivalent to 75% of the capacity. The open-terminal voltages at each depth of discharge are respectively determined as $V_{A1}$ and $V_{A2}$. For electric device B, the depths of discharge equivalent to the depths of discharge of 25% and 75% of non-aqueous secondary cell A and the open-terminal voltages $V_{B1}$ and $V_{B2}$ are respectively determined from the curve of voltage vs. depth of discharge similarly measured. Similarly, the internal resistances, as determined from the voltages when currents are taken at depths of discharge of 25% and 75% in the non-aqueous secondary cell A, are respectively determined as $R_{A1}$ and $R_{A2}$. Similarly in electric device D, the depths of discharge equivalent to the depths of discharge of non-aqueous secondary cell A of 25% and 75% and the internal resistance $R_{D1}$ and $R_{D2}$ are obtained respectively from the curve of internal resistance vs. depth of discharge similarly measured.

In the embodiment, $\Delta V_B$ of electric device B is greater than $\Delta V_A$ of non-aqueous secondary cell A, which is preferable because the power of non-aqueous secondary cell A is more stabilized and greater change in voltage of the electric device B is expected. The ratio $\Delta V_B/\Delta V_A$ is more preferably 2 or more, still more preferably 5 or more, and most preferably 10 or more. On the other hand, the upper limit of the ratio is not particularly limited, but preferably 20 or less, considering the influence on the change in power of the entire assembled battery.

$\Delta R_D$ of electric device D is greater than $\Delta R_A$ of non-aqueous secondary cell A, which is preferable because the output of the non-aqueous secondary cell A is stabilized and greater change in internal resistance of electric device D is expected. The ratio $\Delta R_D/\Delta R_A$ is more preferably 2 or more, and still more preferably 8 or more. On the other hand, the upper limit of the ratio is not particularly limited, but preferably 20 or less, considering the influence on the change in power of the entire assembled battery.

In the embodiment, the capacity $C_B$ of electric device B or the capacity $C_D$ of electric device D is preferably greater than the capacity $C_A$ of non-aqueous secondary cell A. When a electric device B or D having a capacity greater than that of the non-aqueous secondary cell A is used, the range of depth of charge and discharge used in the non-aqueous secondary cell A becomes separated from the overcharge or overdischarge region of the electric device B or D, resulting in decrease of deterioration of the electric device B or D and in reduction of deviation of the relationship between the depth of charge and discharge and voltage or between the depth of charge and discharge and internal resistance from that initially set. Charging and discharging of the assembled battery according to the embodiment is controlled by detection of the voltage of electric device B or the internal resistance of electric device D. When a electric device B or D having a capacity greater than that of the non-aqueous secondary cell A is used, the charging and discharging is not terminated in a state that the non-aqueous secondary cells A still have remaining capacity of charge and discharge, thus allowing sufficient utilization of the capacity of the non-aqueous secondary cells, main constituents in the assembled battery, and thus, giving an assembled battery higher in energy density.

The ratio of the capacity $C_B$ of electric device B to the capacity $C_A$ of non-aqueous secondary cell A, $C_B/C_A$, is preferably 1.05 or more, more preferably 1.1 or more. The ratio of the capacity $C_D$ of electric device D to the capacity $C_A$ of non-aqueous secondary cell A, $C_D/C_A$, is preferably 1.05 or more, more preferably 1.1 or more. On the other hand, since an excessively larger rate leads to expansion of the volume of the electric device B or D in the assembled battery and thus to deterioration in energy density of the assembled battery, the ratio is preferably 1.5 or less, more preferably 1.2 or less.

In the embodiment, the capacity of each cell is a value obtained under the condition for measuring the depth of discharge described above.

Hereinafter, typical configurations of the non-aqueous secondary cell A and the electric device B or D according to the embodiment will be described.

As the non-aqueous secondary cell A, the main constituent of the assembled battery according to the embodiment, a lithium-ion secondary cell, a lithium polymer secondary cell, or the like, which is lighter and supplies high power, is used.

The non-aqueous secondary cell A is a cell employing a transition metal oxide as its positive-electrode active material, which is favorable for making a cell higher in discharge voltage. Typical examples of the positive-electrode active materials include cobalt-based oxides such as $LiCoO_2$, nickel-based oxides such as $LiNiO_2$, manganese-based oxides such as $LiMn_2O_4$, as well as solid-solution oxides of multiple transition metals such as $LiNi_xAl_yCo_zO_2$.

In particular, when the positive electrode in the non-aqueous secondary cell A contains at least one compound selected from iron phosphate compounds and nickel manganese spinel oxides as the positive-electrode active material, such positive-electrode active material, which leads to very smaller fluctuation in voltage or internal resistance with respect to the depth of charge and discharge, is particularly preferable as the positive electrode material for the non-aqueous secondary cell A. The iron phosphate compounds are preferably the iron phosphate compounds represented by the following general formula: $Li_{z1}Fe_{1-y1}M^1_{y1}PO_4$ (where $z^1$, and $y^1$ satisfy $0<z^1 \leqq 1$, and $0 \leqq y^1<1$, and $M^1$ represents a metal selected from Nb, Mg, Ti, Zr, Ta, W, Mn, and Ni). The nickel manganese spinel oxides are preferably 5V-class nickel manganese spinel oxides represented by the following general formula: $Li_{z2}Mn_{1.5-y2}M^2_{y2}Ni_{0.5+\alpha}O_4$ (where $z^2$, $y^2$, and a satisfy $0<z^2 \leqq 1$, $0 \leqq y^2<0.3$, and $-0.1 \leqq \alpha \leqq 0.1$, and $M^2$ represents a metal selected from Co and Ti).

The positive electrode on the non-aqueous secondary cell A is prepared, for example, by coating a mixture of a positive-electrode active material, a binder, and as needed other additives on a positive-electrode current collector and rolling.

Typical favorable examples of the negative-electrode active material for the non-aqueous secondary cell A include carbon materials such as graphite and amorphous carbon, metals such as lithium and tin or the alloys and oxides thereof, and metal oxides such as $LiTi_xO_y$.

The voltage or internal resistance characteristics of the non-aqueous secondary cell are influenced mainly by the kinds of positive-electrode active materials and negative-electrode active materials, and the positive-electrode active material for the non-aqueous secondary cell A is preferably an active material giving low voltage difference or low internal-resistance difference, among the active materials above. In the embodiment, the voltage difference $\Delta V_A$ is preferably 150 mV or less, more preferably 100 mV or less, for obtaining stabilized high power from the assembled battery. Among these active materials, a non-aqueous secondary cell in combination of a positive electrode containing 5V-class spinel lithium manganese oxide, $LiNi_{0.5}Mn_{1.5}O_4$, or an iron phosphate compound, as a positive-electrode active material with a negative electrode containing graphite as a negative-electrode active material gives a particularly flat potential of charge and discharge in the central range, and the $\Delta V_A$ may become 100 mV or less. A non-aqueous secondary cell in combination of the positive-electrode active materials with negative-electrode active materials above shows particularly flat change in internal resistance with respect to the depth of charge and discharge. Thus, it gives highly stabilized power, but makes detection of voltage or internal resistance more difficult, and therefore, the non-aqueous secondary cell in combination of these active materials shows particularly advantageous effects in the present embodiment.

The negative electrode for the non-aqueous secondary cell A is prepared, for example, by coating a mixture of a negative-electrode active material, a binder, and as needed other additives on a negative electrode current collector and rolling. When a metal or alloy such as of lithium is used as the negative electrode, the rolled plate thereof may be used as the negative electrode.

Examples of the non-aqueous electrolytes for the non-aqueous secondary cell A according to the embodiment include not only liquid electrolytes for use in lithium-ion secondary cell but also gel or solid electrolytes for use in lithium polymer secondary cell. Examples of the liquid electrolytes include non-aqueous electrolytes containing a lithium salt such as $LiPF_6$ in an organic solvent such as ethylene carbonate or propylene carbonate. Examples of the gel or solid electrolytes include polyethyleneoxide containing a lithium salt and the like.

Examples of the electric devices B or D according to the embodiment include electric double-layer capacitors containing a non-aqueous electrolyte, non-aqueous secondary cells, and the like. The potential difference $\Delta V_B$ of electric device B is not particularly limited, if it is greater than the potential difference $\Delta V_A$ of non-aqueous secondary cell A, but preferably 200 mV or more, more preferably 300 mV or more, and most preferably 500 mV or more, considering the detection accuracy of the common detection elements. On the other hand, it is preferably 1,300 mV or less, more preferably, 1,000 mV or less, considering the influence of the voltage change on the entire assembled battery. The internal-resistance difference $\Delta R_D$ of electric device D is not particularly limited, if it is greater than the internal-resistance difference $\Delta R_A$ of non-aqueous secondary cell A.

Use of an electric double-layer capacitor as the electric device B is preferable, because it generates a greater voltage change (1,000 mV or more) according to the depth of discharge, which allows accurate detection of the voltage of electric device B and thus accurate detection of the cut-off voltage of charge and discharge in the assembled battery.

FIG. 2C is a characteristic graph showing the relationship between the depth of discharge and the voltage of each cell of non-aqueous secondary cell A and the electric device B according to the embodiment, in which the top graph shows a case when a lithium-ion secondary cell having a capacity of 1,000 mAh is used as the non-aqueous secondary cell A, while the bottom graph, a case when an electric double-layer capacitor having a capacity of 1,000 mAh is used as the electric device B. As shown in FIG. 2C, the electric double-layer capacitor, in which the voltage changes linearly by charging and discharging more than in non-aqueous secondary cell A, is favorably used in the assembled battery for power-supply system that demands strict control of charge and discharge.

In the embodiment, when the electric double-layer capacitor is used as the electric device B, the electric double-layer capacitor having a non-aqueous electrolyte mainly containing an organic solvent such as propylene carbonate is used in order to reduce the influence by gas generation. The electric double-layer capacitor may contain water as an electrolyte component for reduction of resistivity, but the organic solvent is used as the principal component since an electrolyte solution mainly containing water results in significant gas generation.

Examples of the non-aqueous electrolytes for the electric double-layer capacitor include non-aqueous electrolytes containing an electrolyte salt such as triethylmethylammonium tetrafluoroborate ($TEMA.BF_4$) dissolved in the organic solvent described above.

In the embodiment, any one of known electric double-layer capacitors produced by conventional methods may be used as the electric double-layer capacitor. The electric double-layer capacitor having a particular voltage and capacity required when used as part of power-generating elements is selected properly according to the characteristics of the assembled battery.

In the embodiment, use of a non-aqueous secondary cell as the electric device B is preferable, because it allows prevention of deterioration in energy density of the entire assembled battery due to its large energy density and allows avoidance of deviation in the relationship between the depth of charge and discharge and the voltage of electric device B from the initial setting. In addition, the non-aqueous secondary cell is favorably used as the electric device D, because deterioration in energy density of the entire assembled battery is prevented similarly due to the large energy density of the non-aqueous secondary cell, and the relationship between the depth of charge and discharge and the internal resistance of electric device D is less easily deviated from the initial setting.

When the non-aqueous secondary cell is used as the electric device B or D, the non-aqueous secondary cell having the positive electrode, the negative electrode, and the non-aqueous electrolyte similar to those of the non-aqueous secondary cell A described above are used. In particular, $\Delta V_B$ of electric device B should be greater than $\Delta V_A$ of non-aqueous secondary cell A, and thus, the active material showing great voltage change according to the depth of discharge is favorably used. $\Delta R_D$ of electric device D should also be greater than $\Delta R_A$ of non-aqueous secondary cell A, and an active material showing great internal-resistance change according to the depth of discharge is used favorably.

Such a positive-electrode active material preferably contains a lithium oxide represented by $LiMO_2$ (where M represents at least one metal selected from the group consisting of Ni, Co, Mn, Al, and Mg). In particular, solid-solution metal oxides of multiple transition metals such as $LiNi_xAl_yCo_zO_2$ are preferable.

The negative-electrode active material preferably contains at least one material selected from amorphous carbon, metals such as tin or the alloys thereof, and metal oxides. For example, for cost reduction by using the same material for the non-aqueous secondary cell A and the electric device B or D, the same graphite is preferably used for the negative electrodes.

In the embodiment, the positive electrode of the non-aqueous secondary cell A for use is preferably a positive electrode having an average discharge potential with respect to the Li potential smaller than the average discharge potential with respect to the Li potential of the positive electrode of electric device B or D.

In the assembled battery in combination of the non-aqueous secondary cell A and the electric device B or D having such a relationship of the average discharge potential of positive electrode, the potential of the electric device B or D does not become higher than that of the non-aqueous secondary cell A during use; thus, deterioration of the electric device B or D is delayed more than deterioration of the non-aqueous secondary cell A; and it is protected that the capacity of the assembled battery is restricted by the capacity of the deteriorated electric device B or D.

Also in the embodiment, when the non-aqueous secondary cell is used as the electric device B or D, the amount of Mn contained in the positive electrode of the non-aqueous secondary cell A is preferably smaller than that contained in the positive electrode of electric device B or D. For example, when a manganese-based oxide is used as the positive-electrode active material, the manganese ion eluted from the positive electrode by charging and discharging migrates into the negative electrode, forming a film on the negative electrode and impairing the characteristics such as capacity. Accordingly, in the assembled battery in combination of the non-aqueous secondary cell A and the electric device B or D having the above relationship in Mn amount, the Mn amount in the positive electrode of electric device B or D is smaller than that in the positive electrode of the non-aqueous secondary cell A, and thus, deterioration of the electric device B or D becomes slower than deterioration of the non-aqueous secondary cell A. The capacity of the assembled battery is thus protected from restriction due to decrease in capacity of the electric device B or D deteriorated even though the non-aqueous secondary cell A is still in the usable state. Examples of the favorable combination include combinations of the non-aqueous secondary cell A using $LiMn_{1.5}Ni_{0.5}O_4$ as the positive-electrode active material, and the electric device B or D using manganese-free positive-electrode active materials such as $LiCoO_2$ and $LiNiO_2$, or positive-electrode active materials with small manganese content such as $LiNi_{0.4}Mn_{0.3}Co_{0.3}O_2$, and the like.

The assembled battery according to the embodiment is prepared by connecting multiple non-aqueous secondary cells A having the characteristics above and at least one electric device B or D to each other in series. A power-supply system is produced by integrating the assembled battery with a voltage detecting device or an internal-resistance detecting device, an overcharge-prevention circuit, an overdischarge-prevention circuit, and the like.

In the embodiment, in production of the assembled battery in combination of the non-aqueous secondary cell A and the electric device B or D having the capacity greater than that of the non-aqueous secondary cell A, the electric device B or D is preferably charged preliminarily before connection of the non-aqueous secondary cell A to the electric device B or D.

As shown in FIG. 2A, when the capacity of the non-aqueous secondary cell A is different from that of the electric device B, the depth of discharge of electric device B deviates from the depth of discharge of non-aqueous secondary cell A. As a result, if the electric device B having a greater capacity is charged previously in a particular electrical quantity, it is connected to the non-aqueous secondary cell A in the state where the depth of discharge is deviated by the amount of the electricity previously charged. FIG. 2B is a characteristic graph for the assembled battery in combination of the non-aqueous secondary cell A and the electric device B in FIG. 2A when the electric device B is preliminarily charged in an electrical quantity (100 mAh) of about half of the capacity difference between electric device B and non-aqueous secondary cell A.

As shown in FIG. 2B, the region of depth of discharge used for charging and discharging of the electric device B shifts to the central area of the region of depth of discharge of electric device B allowing charging and discharging. The adjustment by the preliminary charge results in shift of the voltage range used by the electric device B expanding the voltage difference to the central area, reducing the deviation of the voltage during charging and discharging and preventing deterioration of the electric device B, because the region of the electric device B used is separated from the overcharge or overdischarge region.

As shown in FIG. 4, when the capacities of the non-aqueous secondary cell A and the electric device D are different from each other, the depth of discharge of electric device D deviates from the depth of discharge of non-aqueous secondary cell A. As a result, if a electric device D having a greater capacity is previously charged in a particular electrical quantity, it is connected to the non-aqueous secondary cell A in the state where the depth of discharge is deviated by the previously charged electrical quantity. FIG. 4 is a characteristic graph for the assembled battery when the electric device D is preliminarily charged in an electrical quantity (200 mAh) of about half of the capacity difference between electric device D and non-aqueous secondary cell A.

As shown in FIG. 4, the region of depth of discharge used for charging and discharging of the electric device D shifts to the central area of the region of depth of discharge of electric device D allowing charging and discharging. The adjustment by the preliminary charge results in shift of the charge and discharge range used by the electric device D expanding the internal-resistance difference to the central area, preventing deterioration of the electric device D, because the region of the electric device D used is separated from the overcharge or overdischarge region.

In the embodiment, the preliminarily charged electrical quantity above is preferably not larger than the capacity difference between the electric device B and the non-aqueous secondary cell A or not larger than the capacity difference between the electric device D and the non-aqueous secondary cell A, and more preferably 20 to 50% of the capacity difference between them, still more preferably about half of the capacity difference. When the preliminarily charged electrical quantity is about half of the capacity difference between both cells, the central positions at a depth of discharge of 50% of both cells become almost identical with each other, and thus, the cells are charged and discharged in the central area allowing use of any cell and thus, protected from deterioration.

Figure 3:
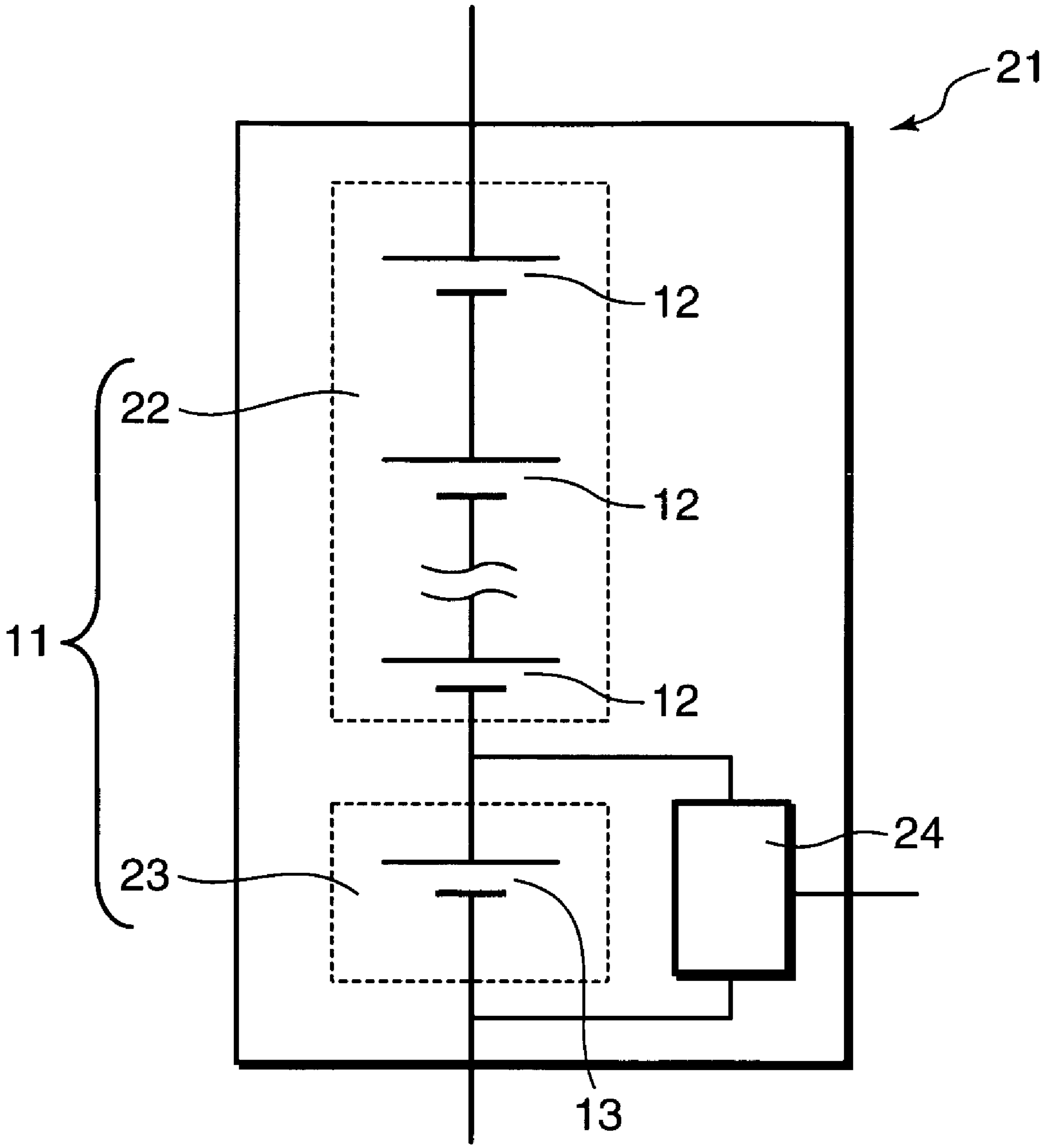
FIG. 3 is a circuit diagram showing an example of the power-supply system according to the present invention.

Hereinafter, the power-supply system in which the assembled battery according to the embodiment is used will be described. FIG. 3 is a schematic view of an example of the power-supply system according to the embodiment; the power-supply system (21) comprises the assembled battery (11) containing a main power-supply unit (22) including multiple non-aqueous secondary cells A (12) and a monitoring unit (23) containing the electric device B or D (13) bound to the multiple non-aqueous secondary cells A (12) connected in series, and a control unit (24) of detecting the voltage of electric device B (13) or the internal resistance of electric device D (13) and controlling charging and discharging of the entire assembled battery based on the detected voltage or internal resistance.

The control unit (24) for use in the power-supply system according to the embodiment is a unit used for control of charging and discharging of conventional assembled batteries. Specifically, for example, the control unit (24) has a detecting means of detecting the terminal voltage of the electric device B (13) or the internal resistance of electric device D (13), a memory means having an inputted data table containing the depth of charge and discharge and the voltage in electric device B previously prepared or having an inputted data table containing the depth of charge and discharge and the internal resistance in electric device D, and a depth of charge and discharge-detecting means of determining the depth of charge and discharge of electric device B (13) based on the detected voltage or determining the depth of charge and discharge of electric device D (13) based on the detected internal resistance. Charging and discharging of the entire assembled battery (11) is controlled, based on the depth of charge and discharge of the electric device B or D (13) obtained.

In the power-supply system above, the depth of charge and discharge of electric device B corresponding to the depth of charge and discharge of non-aqueous secondary cell A is determined and the relationship between the detected voltage and the depth of charge and discharge of the assembled battery is set, according to the relationship between the depth of charge and discharge and the voltage of non-aqueous secondary cell A determined based on the charge/discharge condition previously set in the power-supply system. The range of the depth of charge and discharge used in the non-aqueous secondary cell A during charging and discharging of the assembled battery is decided according to the requirements demanded for the power-supply system in which the assembled battery is installed. For example, only a narrow range of depth of charge and discharge with smaller voltage change may be used in the system demanding an extremely stabilized high power, while a wide range of depth of charge and discharge may be used in the system demanding large-capacity and long-term operation. Even when the assembled battery is used for the power-supply system different in the depth of charge and discharge, the assembled battery according to the embodiment can be applied independently of the depth of charge and discharge of the system, because the electric device B is selected according to the voltage difference between depths of discharge in the range (25 to 75%) commonly used in non-aqueous secondary cells.

Alternatively, in the power-supply system above, the depth of charge and discharge of electric device D corresponding to the depth of charge and discharge of non-aqueous secondary cell A is determined and the relationship between the detected internal resistance and the depth of charge and discharge of the assembled battery is set, according to the relationship between the depth of charge and discharge and the internal resistance of non-aqueous secondary cell A determined based on the charge/discharge condition previously set in the power-supply system. The range of the depth of charge and discharge used in the non-aqueous secondary cell A during charging and discharging of the assembled battery is determined according to the requirements needed for the power-supply system in which the assembled battery is installed. For example, only a narrow range of depth of charge and discharge with smaller internal-resistance change may be used in the system demanding an extremely stabilized high power, while a wide range of depth of charge and discharge may be used in the system demanding large-capacity and long-term operation. Even when the assembled battery is used for the power-supply system different in the depth of charge and discharge, the assembled battery according to the embodiment can be applied independently of the depth of charge and discharge of the system, because the electric device D is selected according to the internal-resistance difference between depths of discharge in the range (25 to 75%) commonly used in non-aqueous secondary cells.

Although the present invention has been described in terms of the presently favorable embodiments, such embodiments are illustrative in all aspects and are not to be interpreted as restrictive. It is to be construed that an unlimited number of modifications not described above are embodied without departing from the scope of the present invention.

Hereinafter, typical favorable embodiments of the assembled battery will be described, but it should be understood that the present invention is not limited by these embodiments.

Embodiment 1

In the present embodiment, an assembled battery in combination of lithium-ion secondary cells as the non-aqueous secondary cells A with a similar lithium-ion secondary cell as the electric device B was studied.

[Preparation of Cell]

(Lithium-Ion Secondary Cell 1: L-1)

100 parts by mass of $LiNi_{0.5}Mn_{1.5}O_4$ as the positive-electrode active material, 2.5 parts by mass of acetylene black as a conductive agent, and 4 parts by mass of polyvinylidene fluoride (PVDF) as a binder were blended in a dispersion medium, to yield a positive electrode slurry. The slurry was coated, dried, and rolled on both faces of a current collector, an aluminum foil having a thickness of 15 μm, and the resulting film was cut into a piece of a particular size, to give a positive electrode plate.

Separately, 100 parts by mass of graphite as the negative-electrode active material and 6 parts by mass of PVDF as a binder were blended in a dispersion medium, to yield a negative electrode slurry. The slurry was coated, dried, and rolled on both faces of a current collector, a copper foil having a thickness of 10 μm, and the resulting film was cut into a piece of a particular size, to give a negative electrode plate.

The positive and negative electrode plates thus prepared were wound spirally with a 27 μm polyethylene separator being interposed therebetween, to give an electrode unit. The electrode unit was placed in a battery case, and an electrolytic solution containing 1.5 M $LiBF_4$ in a mixed solvent of ethylene carbonate (EC) and ethyl methyl carbonate (EMC) at a ratio of 1:3 by volume was poured into the battery case, to give a lithium-ion secondary cell 1 (L-1) having a battery-case external diameter of 18 mm and a height of 65 mm (size: 18650).

The cell thus prepared had a capacity of 1,000 mAh in a cut-off voltage of charge of 4.85 V and in a cut-off voltage of discharge of 3.0 V at a current of 0.2 C.

(Lithium-Ion Secondary Cell 2: L-2)

A lithium-ion secondary cell 2 (L-2) was prepared in a similar manner to L-1, except that the positive-electrode active material $LiNi_{0.5}Mn_{0.5}O_4$ was replaced with $LiNi_{0.8}Al_{0.1}Cu_{0.2}O_2$, the coating amount was changed to make the cell having a capacity 1.2 times greater than that of L-1, and the coating amount of the negative electrode was also altered according to the change.

The cell thus prepared had a capacity of 1,200 mAh in a cut-off voltage of charge of 4.2 V and in a cut-off voltage of discharge of 3.0 V at a current of 0.2 C.

(Lithium-Ion Secondary Cell 3: L-3)

A lithium-ion secondary cell 3 (L-3) was prepared in a similar manner to L-2, except that the negative-electrode active material graphite was replaced with amorphous carbon.

The cell thus prepared had a capacity of 1,200 mAh in a cut-off voltage of charge of 4.2 V and in a cut-off voltage of discharge of 3.0 V at a current of 0.2 C.

(Lithium-Ion Secondary Cell 4: L-4)

A lithium-ion secondary cell 4 (L-4) was prepared in a similar manner to L-2, except that the battery volume was increased to give the cell having a capacity of 2,000 mAh.

[Preparation of Assembled Battery]

(Assembled Battery 1)

The cells L-1 and L-2 thus prepared were activated by charging and discharging and also by aging, and the cell L-2, which was used as the electric device B, was subjected to a preliminary charge before connection. The cell L-2 was preliminarily charged in an electrical amount of half of the capacity difference between the capacity of the cell L-2 to be used as the electric device B and the cell L-1 to be used as the non-aqueous secondary cell A. Then, 10 cells L-1 were connected in series, and one cell L-2 as the electric device B was connected in series to the terminal of L-1, to give an assembled battery 1.

(Assembled Battery 2)

An assembled battery 2 was prepared in a similar manner to the assembled battery 1, except that the cell L-3 was used as the electric device B in preparation of the assembled battery 1.

(Assembled Battery 3)

An assembled battery 3 was prepared in a similar manner to the assembled battery 1, except that, in modifying the preparation of the assembled battery 1, the cell L-2 was preliminarily charged in an electrical quantity of 20% of the capacity difference between the cells L-2 and L-1.

(Assembled Battery 4)

An assembled battery 4 was prepared in a similar manner to the assembled battery 1, except that the cell L-4 was used as the electric device B in preparation of the assembled battery 1.

(Assembled Battery 5)

An assembled battery 5 was prepared in a similar manner to the assembled battery 1, except that the cell L-2 was not preliminarily charged in preparation of the assembled battery 1.

(Assembled Battery 6)

An assembled battery 6 was prepared in a similar manner to the assembled battery 1, except that 11 cells L-1 were connected in series in preparation of the assembled battery 1. Since a same cell L-1 was connected to the terminal of 10 cells L-1 and used as the electric device B, it was not preliminarily charged.

The voltages $V_{A1}$ and $V_{A2}$ in the cell L-1 respectively at depths of discharge of 25% and 75%, the voltage difference $\Delta V_A$, and the capacity $C_A$ of the cell L-1, and the voltages $V_{B1}$ and $V_{B2}$ in the cells L-2 to L-4 at depths of discharge equivalent to those above, the voltage difference $\Delta V_B$, and the capacity $C_B$ of the cells L-2 to L-4 in the respective assembled battery thus prepared are summarized in Table 1.

The power and the deviation in depth of charge and discharge after cycle were determined for each entire assembled battery. The power of the assembled battery was determined by measuring the voltage and the current 10 seconds after discharged at a depth of discharge of 50% and a current of 2 A, and evaluated relative to the power of the assembled battery 6 as 100%.

The deviation of depth of charge and discharge after cycle was evaluated by performing cycle test (number of cycles: 50) for each assembled battery in which charging and discharging are controlled by the voltage of electric device B at a depth of discharge equivalent to the depth of discharge of 25% and 75% in non-aqueous secondary cell A at 1 C, terminating discharging at a voltage of the electric device B showing a depth of discharge of 50% at the initial setting, and determining the deviation of the measured depth of discharge of the cell L-1 in each assembled battery from the initial setting of depth of discharge of 50%.

The results are summarized in Table 1.

TABLE 1

|  |  | ASSEMBLED BATTERY | | | | | |
|---|---|---|---|---|---|---|---|
|  |  | 1 | 2 | 3 | 4 | 5 | 6 |
| NON-AQUEOUS SECONDARY CELL A | CELL | L-1 | L-1 | L-1 | L-1 | L-1 | L-1 |
|  | $\Delta V_A$(mV) | 80 | 80 | 80 | 80 | 80 | 80 |
|  | $C_A$(mAh) | 1000 | 1000 | 1000 | 1000 | 1000 | 1000 |
| ELECTRIC DEVICE B | CELL | L-2 | L-3 | L-2 | L-4 | L-2 | L-1 |
|  | $\Delta V_B$(mV) | 330 | 730 | 330 | 200 | 340 | 80 |
|  | $C_B$(mAh) | 1200 | 1200 | 1200 | 2000 | 1200 | 1000 |
|  | PRELIMINARY CHARGE | YES | YES | YES | YES | NO | NO |
| POWER OF ASSEMBLED BATTERY (%) |  | 98 | 98 | 98 | 99 | 98 | 100 |
| $\Delta V_B/\Delta V_A$ |  | 4 | 9 | 4 | 3 | 4 | 1 |
| $C_B/C_A$ |  | 1.2 | 1.2 | 1.2 | 2 | 1.2 | 1 |
| DEVIATION IN DEPTH OF DISCHARGE (%) |  | 2 | 1 | 2 | 3 | 4 | 12 |

As shown in Table 1, the combination of the non-aqueous secondary cells A and the electric device B having a voltage difference $\Delta V_B$ approximately 3 to 9 times larger than the voltage difference $\Delta V_A$ in the non-aqueous secondary cell A, gives the assembled battery having a depth of discharge in the non-aqueous secondary cell A less deviated from the initial setting even after cycle. Although a lithium-ion secondary cell showing larger voltage change is used as the electric device B, use of one electric device B with respect to 10 non-aqueous secondary cells A also prevents decrease in power density.

Thus, the assembled battery according to the embodiment provides high power; and, because voltage detection is made with the electric device B larger in voltage change, it is possible to determine the late charge and discharge state accurately even when the non-aqueous secondary cells A smaller in voltage change are mainly used, reduce deviation of depth of charge and discharge, and prevent overcharge and overdischarge effectively. The assembled batteries 1 to 4, although they employ the electric device B having a capacity greater than that of the non-aqueous secondary cell A, show smaller voltage deviation during charging and discharging of the assembled battery and prevent complete discharge of the electric device B and deterioration thereof, because the electric device B is preliminarily charged in a particular electrical quantity for adjustment of the depth of discharge. In this way, it is possible to obtain the assembled battery with smaller deviation of depth of charge and discharge.

According to an apparatus in which the power-supply system is applied, various active materials different in discharge characteristics are used for improvement in various properties as battery such as lifetime and heat stability. For example, when a transition metal oxide is used as the positive-electrode active material, the metal site may be replaced with a metal element such as Ni, Co, Mn, Fe, Cr, Al, Ti, Mg, and Zn, and the oxygen site with F or the like. The relationship in voltage difference between the non-aqueous secondary cell A and the electric device B may vary according to the composition of the positive-electrode active material and the capacity balance of the positive electrode with the negative electrode. Even in such a case, however, the invented assembled battery can provide the advantageous effects by using the cell having the voltage difference $\Delta V_B$ greater than the potential difference $\Delta V_A$ as the electric device B.

Embodiment 2

In the present embodiment, an assembled battery in combination of lithium-ion secondary cells as the non-aqueous secondary cells A with an electric double-layer capacitor as the electric device B was studied.

[Preparation of Cell]

(Capacitor 1: C-1)

An activated carbon-coated aluminum foil was used as the positive and negative electrodes, and the foils were wound spirally via a separator being interposed between both electrodes facing each other, to give an element. The element was placed in a case and impregnated with a non-aqueous electrolyte containing an electrolyte salt dissolved in a solvent, to give a capacitor 1 (C-1).

The capacitor thus prepared had a capacity of 1,000 mAh in a cut-off voltage of charge of 2.5 V and in a cut-off voltage of discharge of 0 V at a current of 0.2 C.

(Capacitor 2: C-2)

A capacitor 2 (C-2) was prepared in a similar manner to C-1, except that positive and negative electrodes larger in electrode area were used to make the element having a capacity 1.2 times greater than that of C-1.

The capacitor thus prepared had a capacity of 1,200 mAh in a cut-off voltage of charge of 2.5 V and in a cut-off voltage of discharge of 0 V at a current of 0.2 C.

[Preparation of Assembled Battery]

(Assembled Battery 7)

An assembled battery 7 was prepared in a similar manner to assembled battery 1, except that the capacitor C-1 thus prepared was used as the electric device B and the cell L-1 prepared in embodiment 1 as the non-aqueous secondary cell A. The cells L-1 and C-1 had the same capacity, and thus, there was no preliminary charging conducted.

(Assembled Battery 8)

An assembled battery 8 was prepared in a similar manner to assembled battery 1, except that the capacitor C-2 was used as the electric device B in preparation of the assembled battery 1.

For the assembled batteries 7 and 8 thus prepared, the power and the deviation in depth of charge and discharge after cycle were evaluated in the manner similar to embodiment 1.

The evaluation results are summarized in Table 2, together with those of the assembled battery 6.

TABLE 2

| | | ASSEMBLED BATTERY | | |
|---|---|---|---|---|
| | | 7 | 8 | 6 |
| NON-AQUEOUS | CELL | L-1 | L-1 | L-1 |
| SECONDARY | $\Delta V_A$(mV) | 80 | 80 | 80 |
| CELL A | $C_A$(mAh) | 1000 | 1000 | 1000 |
| ELECTRIC | CELL | C-1 | C-2 | L-1 |
| DEVICE B | $\Delta V_B$(mV) | 1220 | 1020 | 80 |
| | $C_B$(mAh) | 1000 | 1200 | 1000 |
| | PRELIMINARY CHARGE | NO | YES | NO |
| | POWER OF ASSEMBLED BATTERY (%) | 94 | 94 | 100 |
| | $\Delta V_B/\Delta V_A$ | 15 | 13 | 1 |
| | $C_B/C_A$ | 1 | 1.2 | 1 |
| | DEVIATION IN DEPTH OF DISCHARGE (%) | 1 | 1 | 12 |

As apparent from Table 2, the assembled batteries 7 and 8 having the electric double-layer capacitor as the electric device B have respectively smaller deviation in depth of discharge than the assembled battery 6 containing only the same lithium-ion secondary cells. As for the power of the assembled battery, the power of the assembled batteries 7 and 8 is slightly lower than that of the assembled battery 6 containing only the lithium-ion secondary cells, but the difference is only 6% or less, and thus, it is possible to obtain the assembled battery having a similar energy density.

Embodiment 3

In the present embodiment, an assembled battery in combination of lithium-ion secondary cells as the non-aqueous secondary cells A with the same kind of lithium-ion secondary cell as the electric device D was studied.

[Preparation of Cell]

(Lithium-Ion Secondary Cell 5: L-5)

100 parts by mass of $LiFePO_4$ as a positive-electrode active material, 10 parts by mass of acetylene black as a conductive agent, 4 parts by mass of polyvinylidene fluoride (PVDF) as a binder were blended in a dispersion medium, to give a positive-electrode slurry. The slurry was coated, dried, and rolled on both faces of a current collector, an aluminum foil having a thickness of 15 μm, and the resulting film was cut into a piece of a particular size, to give a positive electrode plate. Because the electron resistance of $LiFePO_4$ is low, the active material having a smaller particle diameter of about 100 nm was used.

Separately, 100 parts by mass of graphite as a negative-electrode active material and 6 parts by mass of PVDF as a binder were blended in a dispersion medium, to give a negative electrode slurry. The slurry was coated, dried and rolled on both faces of a current collector, a copper foil having a thickness of 10 μm, and the resulting film was cut into a piece of a particular size, to give a negative electrode plate.

The positive and negative electrode plates thus prepared were wound spirally via a 20 μm polyethylene separator with both electrodes facing each other, to give an electrode unit. The electrode unit was placed in a battery case; and an electrolytic solution of 1.4M $LiPF_4$ dissolved in a mixed solvent of ethylene carbonate (EC), ethyl methyl carbonate (EMC) and dimethyl carbonate (DMC) at a volume ratio of 1:1:8 was poured into the battery case, to give a lithium-ion secondary cell 5 (L-5) having a battery-case external diameter of 26 mm and a height of 65 mm (size: 26650).

The battery thus prepared had a capacity of 2,000 mAh in a cut-off voltage of charge of 3.7 V and in a cut-off voltage of discharge of 2.0 V at a current of 0.2 C.

(Lithium-Ion Secondary Cell 6: L-6)

A lithium-ion secondary cell 6 (L-6) was prepared in a similar manner to L-5, except that $LiFePO_4$ used as the positive-electrode active material was replaced with $LiNi_{1/3}Mn_{1/3}Co_{1/3}O_2$, the coating amount was so changed that the capacity thereof became 1.2 times greater than that of L-5, and the coating amount of the negative electrode was also altered according to the change above.

The cell thus prepared had a capacity of 2,400 mAh in a cut-off voltage of charge of 4.2 V and in a cut-off voltage of discharge of 2.5 V at a current of 0.2 C.

FIG. 4 shows the change in internal resistance with respect to the depth of discharge for the cell L-5 (top graph) and the cell L-6 (bottom graph). The internal resistance in FIG. 4 was determined in such a manner that the cell was adjusted to each of the depth of discharge, the open voltage $V_x$ and the voltage $V_y$ after discharging at 2 A for 10 seconds were measured, and then, the voltage difference ($V_x-V_y$) was divided by the current value (2 A).

As shown in FIG. 4, the cell L-5 shows a change in internal resistance smaller than that of the cell L-6. It is thus possible to obtain the assembled battery having smaller internal-resistance difference independently of the depth of charge and discharge, which means smaller power fluctuation, by forming the assembled battery with the cell L-5. The power-supply system prepared with the assembled battery showing smaller power fluctuation is advantageous in that the power-supply system is more easily designed without consideration of reduction in power along the depth of charge and discharge.

[Preparation of Assembled Battery]

(Assembled Battery 9)

The cells L-5 and L-6 thus prepared were activated by charging and discharging and also by aging, and the cell L-6 used as the electric device D was additionally subjected to a preliminary charge before connection. An electrical quantity half of the difference between the capacity of L-6 used as electric device D and capacity of L-5 used as non-aqueous secondary cell A was charged in the preliminary charge. Then, 10 cells L-5 were connected in series, and one cell L-6 as the electric device D was connected in series to the terminal of L-5, to give an assembled battery 9.

(Assembled Battery 10)

An assembled battery 10 was prepared in a similar manner to the assembled battery 9, except that 11 cells L-5 were connected to each other in series. Since one of the same cells L-5 connected to the terminal was used as the electric device D, it was not preliminarily charged.

In each assembled battery thus prepared, the internal-resistance difference $\Delta R_A$ between the internal resistances at depths of discharge at 25% and 75% and the capacity $C_A$ in the cell L-5 and the internal-resistance difference $\Delta R_D$ between the internal resistances at depths of discharge corresponding to the depths of discharge above and the capacity $C_D$ in the cell L-6 are summarized in Table 3.

The power and the deviation in depth of charge and discharge after cycle were determined for each entire assembled battery. The power of the assembled battery was determined by measuring the voltage and the current 10 seconds after discharged at a depth of discharge of 50% and a current of 10 A, and evaluated relative to the power of the assembled battery 10 as 100%.

The deviation of depth of charge and discharge after cycle was evaluated by performing cycle test (number of cycles: 50) for each assembled battery in which charging and discharging are controlled by the voltage of electric device D at a depth of discharge equivalent to the depth of discharge of 25% and 75% in non-aqueous secondary cell A at 1 C, terminating discharging at a voltage of the electric device D showing a depth of discharge of 50% at the initial setting, and determining the deviation of the measured depth of discharge of the cell L-5 in each assembled battery from the initial setting of depth of discharge of 50%.

The results are summarized in Table 3.

TABLE 3

| | | ASSEMBLED BATTERY 9 | ASSEMBLED BATTERY 10 |
|---|---|---|---|
| NON-AQUEOUS SECONDARY CELL A | CELL | L-5 | L-5 |
| | $\Delta R_A$(mΩ) | 4 | 4 |
| | $C_A$(mAh) | 2000 | 2000 |
| ELECTRIC DEVICE D | CELL | L-6 | L-5 |
| | $\Delta R_D$(mΩ) | 32 | 4 |
| | $C_D$(mAh) | 2400 | 2000 |
| PRELIMINARY CHARGE | | YES | NO |
| POWER OF ASSEMBLED BATTERY (%) | | 100 | 100 |
| $\Delta R_D/\Delta R_A$ | | 8 | 1 |
| $C_D/C_A$ | | 1.2 | 1 |
| DEVIATION IN DEPTH OF DISCHARGE (%) | | 1 | 14 |

As shown in Table 3, by forming the assembled battery in combination of the non-aqueous secondary cells A and the electric device D having a internal-resistance difference $\Delta R_D$ approximately 8 times larger than the internal-resistance difference $\Delta R_A$ in the non-aqueous secondary cell A, it gives the assembled battery having a depth of discharge in the non-aqueous secondary cell A less deviated from the initial setting in the assembled battery even after cycle. Although a lithium-ion secondary cell showing larger internal-resistance change is used as the electric device D, use of one electric device D with respect to 10 non-aqueous secondary cells A also prevents internal-resistance change in the assembled battery.

Thus, the assembled battery according to the embodiment provides high power stably and independently of depth of charge and discharge; and, because internal-resistance detection is made with a electric device D larger in internal-resistance change, it is possible to determine the late charge and discharge state accurately even when the non-aqueous secondary cells A smaller in internal-resistance change are mainly used, reduce deviation of depth of charge and discharge, and prevent overcharge and overdischarge effectively. The assembled battery 9, although it employs the electric device D having a capacity greater than that of the non-aqueous secondary cell A, shows smaller voltage deviation during charging and discharging of the assembled battery and prevents complete discharge of the electric device D and deterioration thereof, because the electric device D is preliminarily charged in a particular electrical quantity for adjustment of the depth of discharge. In this way, it is possible to obtain the assembled battery with smaller deviation of depth of charge and discharge.

As mentioned above, an assembled battery, comprise mainly multiple non-aqueous secondary cells A and at least one electric device B for voltage detection containing a non-aqueous electrolyte connected to the multiple non-aqueous secondary cells A in series. When a difference in the non-aqueous secondary cell A between a voltage per cell ($V_{A1}$) at a depth of discharge of 25% and a voltage per cell ($V_{A2}$) at a depth of discharge of 75% is designated as $\Delta V_A$, and a difference in the electric device B between a voltage per cell ($V_{B1}$) at a depth of discharge equivalent to the depth of discharge of 25% of the non-aqueous secondary cell A and a voltage per cell ($V_{B2}$) at a depth of discharge equivalent to the depth of discharge of 75% of the non-aqueous secondary cell A, as $\Delta V_B$, the $\Delta V_B$ of electric device B is greater than the $\Delta V_A$ of non-aqueous secondary cell A.

In the above arrangement, incorporated into the assembled battery is the electric device B having the change of voltage per cell greater than that of the non-aqueous secondary cell A in the depth of discharge range corresponding to the depth of discharge range where the voltage change in the non-aqueous secondary cell A, a high-power cell for use in large-scale power-supply system, is small. Because the depth of charge and discharge of the assembled battery is determined from the change in voltage of electric device B, such assembled battery allows more accurate detection of the depth of charge and discharge than an assembled battery containing only non-aqueous secondary cells A. In addition, because the electric device B containing the non-aqueous electrolyte smaller in the deviation of depth of charge and discharge due to charging and discharging is used as the battery for detection, deviation of the depth of charge and discharge of electric device B from the initial setting is prevented even after long-term usage. As a result, deviation of the depth of charge and discharge of the non-aqueous secondary cell A from the detected depth of charge and discharge of the assembled battery is prevented.

In the assembled battery, a battery capacity per cell of the electric device B, $C_B$, is preferably larger than a battery capacity per cell of the non-aqueous secondary cell A, $C_A$.

In the configuration above, the assembled battery in the late charging state is not restricted by the electric device B in the late charging state, because the battery capacity per cell of electric device B, $C_B$, is larger than the battery capacity per cell of the non-aqueous secondary cell A, $C_A$. Thus, the high-power non-aqueous secondary cells A, major constituent of the assembled battery, are utilized effectively.

The electric device B for use in the assembled battery is preferably an electric double-layer capacitor.

In the configuration above, it is possible to obtain the capacitor with greater voltage change and thus, to determine the depth of charge and discharge of electric device B accurately.

In addition, the electric device B for use in the assembled battery is preferably a non-aqueous secondary cell.

In the configuration above, it is possible to use the non-aqueous secondary cell with high energy density as the capacitor for the detection and thus, to reduce deterioration in energy density of the entire assembled battery. It is also possible to obtain the electric device B having a relationship between the depth of charge and discharge and voltage less deviated from the initial setting.

When a non-aqueous secondary cell similar to the non-aqueous secondary cell A is used as the electric device B in the assembled battery, a negative electrode of the non-aqueous secondary cell A preferably contains a graphite-based carbon material as a negative-electrode active material, and a negative electrode of the electric device B preferably contains at least one material selected from amorphous carbon, alloys and metal oxides as a negative-electrode active material.

In the configuration above, the graphite-based carbon material has small voltage change in the normal operation range of non-aqueous secondary cell, while the material such as amorphous carbon has greater voltage change in the same range, and thus, these materials make the voltage detection easier. It is also possible to obtain the assembled battery in combination of the non-aqueous secondary cell A and the electric device B that is higher in power and smaller in deviation of depth of charge and discharge.

In the assembled battery, when a non-aqueous secondary cell similar to the non-aqueous secondary cell A is used as the electric device B, a positive electrode of the non-aqueous secondary cell A preferably contains at least one compound selected from iron phosphate compounds and nickel manganese spinel oxides as a positive-electrode active material, and a positive electrode of the electric device B preferably contains a lithium oxide represented by $LiMO_2$ (where M represents at least one metal selected from the group consisting of Ni, Co, Mn, Al, and Mg) as a positive-electrode active material.

In the configuration above, the iron phosphate compound or the nickel manganese spinel oxide used as the positive-electrode active material has very small voltage change in the normal operation range of non-aqueous secondary cell, and the lithium oxide represented by $LiMO_2$ used as the positive-electrode active material has large voltage change in the same range, and thus, these compounds makes voltage detection easier. It is also possible to obtain the assembled battery in combination of the non-aqueous secondary cell A and the electric device B having high power with smaller deviation of depth of charge and discharge.

Another assembled battery comprises mainly multiple non-aqueous secondary cells A and at least one electric device D for internal-resistance detection containing a non-aqueous electrolyte connected to the multiple non-aqueous secondary cells A in series. When the difference in the non-aqueous secondary cells A between an internal resistance per cell ($R_{A1}$) at a depth of discharge of 25% and an internal resistance per cell ($R_{A2}$) at a depth of discharge of 75% is designated as $\Delta R_A$, and a difference in the electric device D between an internal resistance per cell ($R_{D1}$) at a depth of discharge equivalent to the depth of discharge of 25% of the non-aqueous secondary cell A and an internal resistance per cell ($R_{D2}$) at a depth of discharge equivalent to the depth of discharge of 75% of the non-aqueous secondary cell A, as $\Delta R_D$, the $\Delta R_D$ of electric device D is greater than the $\Delta R_A$ of non-aqueous secondary cell A.

In the above arrangement, incorporated into the assembled battery is the electric device D having the internal-resistance change per cell greater than that of the non-aqueous secondary cell A in the depth of discharge range corresponding to the depth of discharge range where the internal-resistance change in the non-aqueous secondary cell A, a high-power cell for use in large-scale power-supply system, is small. Because the depth of charge and discharge of the assembled battery is determined from the change in internal resistance of electric device D, such assembled battery allows more accurate detection of the depth of charge and discharge than an assembled battery containing only non-aqueous secondary cells A.

In the assembled battery, a battery capacity per cell of the electric device D, $C_D$, is preferably greater than a battery capacity per cell of the non-aqueous secondary cell A, $C_A$.

In the configuration above, the assembled battery in the late charging state is not restricted by the electric device D in late charging state, because the battery capacity per cell of the electric device D, $C_D$, is greater than the battery capacity per cell of the non-aqueous secondary cell A, $C_A$. Thus, the high-power non-aqueous secondary cells A, major constituent of the assembled battery, are utilized effectively.

In addition, the electric device D for use in the assembled battery is preferably a non-aqueous secondary cell.

In the configuration above, it is possible to use the non-aqueous secondary cell with high energy density as the capacitor for the detection and thus, to reduce deterioration in energy density of the entire assembled battery. It is also possible to obtain the electric device D having a relationship between the depth of charge and discharge and the internal resistance less deviated from the initial setting.

When a non-aqueous secondary cell similar to the non-aqueous secondary cell A is used as the electric device D, a negative electrode of the non-aqueous secondary cell A preferably contains a graphite-based carbon material as a negative-electrode active material, and a negative electrode of the electric device D preferably contains at least one material selected from amorphous carbon, alloys and metal oxides as a negative-electrode active material.

In the configuration above, the graphite-based carbon material has small internal-resistance change in the normal operation range of non-aqueous secondary cell, while the material such as amorphous carbon has greater internal resistance change in the same range, and thus, these materials make the internal resistance detection easier. It is also possible to obtain the assembled battery in combination of the non-aqueous secondary cell A and the electric device D that is higher in power and smaller in deviation of depth of charge and discharge.

When a non-aqueous secondary cell similar to the non-aqueous secondary cell A is used as the electric device D, a positive electrode of the non-aqueous secondary cell A preferably contains at least one compound selected from iron phosphate compounds and nickel manganese spinel oxides as a positive-electrode active material, and a positive electrode of the electric device D preferably contains a lithium oxide represented by $LiMO_2$ (where M represents at least one metal selected from the group consisting of Ni, Co, Mn, Al, and Mg) as a positive-electrode active material.

In the configuration above, the iron phosphate compound or the nickel manganese spinel oxide used as the positive-electrode active material has very small internal-resistance change in the normal operation range of non-aqueous secondary cell, and the lithium oxide represented by $LiMO_2$ used as the positive-electrode active material has large internal-resistance change in the same range, and thus, these compounds makes internal-resistance detection easier. It is also possible to obtain the assembled battery in combination of the non-aqueous secondary cell A and the electric device D having high power with smaller deviation of depth of charge and discharge.

By preparing a power-supply system with the assembled battery above, it is possible to supply the power-supply system supplying high power with smaller power fluctuation independently of the depth of charge and discharge, and controlling the depth of charge and discharge accurately.

A method of producing an assembled battery includes mainly multiple non-aqueous secondary cells A. The multiple non-aqueous secondary cells A and at least one electric device B for voltage detection containing a non-aqueous electrolyte are connected to each other in series; when a difference in the non-aqueous secondary cell A between a voltage per cell ($V_{A1}$) at a depth of discharge of 25% and a voltage per cell ($V_{A2}$) at a depth of discharge of 75% is designated as $\Delta V_A$, and a difference in the electric device B between a voltage per cell ($V_{B1}$) at a depth of discharge equivalent to the depth of discharge of 25% of the non-aqueous secondary cell A and a voltage per cell ($V_{B2}$) at a depth of discharge equivalent to the depth of discharge of 75% of the non-aqueous secondary cell A, as $\Delta V_B$, the $\Delta V_B$ of electric device B is greater than the $\Delta V_A$ of non-aqueous secondary cell A; and a battery capacity per cell ($C_B$) of the electric device B is greater than a battery capacity per cell ($C_A$) of the non-aqueous secondary cell A, and wherein the electric device B is subjected to a preliminary charge before the electric device B is connected to the non-aqueous secondary cells A.

When the assembled battery in which the capacity of electric device B is greater than the capacity of non-aqueous secondary cell A is used for more effective use of the capacity of the non-aqueous secondary cells A, the main constitute of the assembled battery, for example, if the depths of discharge of both cells in the uncharged states are set so as to correspond to each other initially, the depth of discharge of electric device B becomes smaller than the depth of discharge of non-aqueous secondary cell in the late charging state for the assembled battery. As a result, the electric device B may be discharged completely, because the depth of charge and discharge of electric device B may deviate during charging and discharging, leading to easier deterioration of the battery by charge/discharge cycle and easier deviation of the relationship between the depth of charge and discharge and voltage. However, in the configuration above, because the electric device B is preliminarily charged before it is connected to the non-aqueous secondary cell A, it is possible to prevent complete discharge of the electric device B in the range corresponding to the depth of charge and discharge used in the non-aqueous secondary cell A.

In the method of producing the assembled battery, an amount of the preliminary charge is preferably not larger than a difference in capacity between the battery capacity per cell ($C_B$) of the electric device B and the battery capacity per cell ($C_A$) of the non-aqueous secondary cell A.

In the configuration above, even when the capacity of electric device B is greater than that of the non-aqueous secondary cell A, the range used for charging and discharging of electric device B shifts to the central range by the preliminary charge, and the electric device B can be charged and discharged at the non-deviated depth of charge and discharge.

In the method of producing the assembled battery, the amount of the preliminary charge is preferably about half of the difference in capacity between the battery capacity per cell ($C_B$) of the electric device B and the battery capacity per cell ($C_A$) of the non-aqueous secondary cell A.

In the configuration above, the central position of the depth of charge and discharge of non-aqueous secondary cell A becomes almost the same as the central position of depth of charge and discharge usable in charging and discharging of the electric device B, which further prevents deterioration of the electric device B.

Another method of producing an assembled battery includes mainly multiple non-aqueous secondary cells A. The multiple non-aqueous secondary cells A and at least one electric device D for internal-resistance detection containing a non-aqueous electrolyte are connected to each other in series; when a difference in the non-aqueous secondary cell A between a internal resistance per cell ($R_{A1}$) at a depth of discharge of 25% and a internal resistance per cell ($R_{A2}$) at a depth of discharge of 75% is designated as $\Delta R_A$, and a difference in the electric device B between a internal resistance per cell ($R_{D1}$) at a depth of discharge equivalent to the depth of discharge of 25% of the non-aqueous secondary cell A and a internal resistance per cell ($R_{D2}$) at a depth of discharge equivalent to the depth of discharge of 75% of the non-aqueous secondary cell A, as $\Delta R_D$, the $\Delta R_D$ of electric device D is greater than the $\Delta R_A$ of non-aqueous secondary cell A; and a battery capacity per cell ($C_D$) of the electric device D is greater than a battery capacity per cell ($C_A$) of the non-aqueous secondary cell A, and wherein the electric device D is subjected to a preliminary charge before the electric device D is connected to the non-aqueous secondary cells A.

When the assembled battery in which the capacity of electric device D is greater than the capacity of non-aqueous secondary cell A is used for more effective use of the capacity of the non-aqueous secondary cells A, the main constitute of the assembled battery, for example, if the depths of discharge of both cells are set so as to correspond to each other initially, the depth of discharge of electric device D becomes smaller than the depth of discharge of non-aqueous secondary cell in the late charging state of the assembled battery. As a result, the electric device D may be discharged completely, because the depth of charge and discharge of electric device D may deviate during charging and discharging, leading to easier deterioration of the battery by charge/discharge cycle and easier deviation of the relationship between the depth of charge and discharge and internal resistance. However, in the configuration above, because the electric device D is preliminarily charged before it is connected to the non-aqueous secondary cell A, it is possible to prevent complete discharge of the electric device D in the range corresponding to the depth of charge and discharge used in the non-aqueous secondary cell A.

In the method of producing the assembled battery, an amount of the preliminary charge is preferably not larger than a difference in capacity between the battery capacity per cell ($C_D$) of the electric device D and the battery capacity per cell ($C_A$) of the non-aqueous secondary cell A.

In the configuration above, even when the capacity of electric device D is greater than that of the non-aqueous secondary cell A, the range used for charging and discharging of electric device D shifts to the central range by the preliminary charge, and the electric device D can be charged and discharged at the non-deviated depth of charge and discharge.

In the method of producing the assembled battery, the amount of the preliminary charge is preferably about half of the difference in capacity between the battery capacity per cell ($C_D$) of the electric device D $C_D$ and the battery capacity per cell ($C_A$) of the non-aqueous secondary cell A.

In the configuration above, the central position of the depth of charge and discharge of non-aqueous secondary cell A becomes almost the same as the central position of depth of charge and discharge usable in charging and discharging of the electric device D, which further prevents deterioration of electric device D.

The assembled battery mainly containing multiple non-aqueous secondary cells enables to supply high power consistently and to detect the late charging and discharging state of setting accurately by an inexpensive method without making the apparatus of power-supply system more complicated. It is also possible to prevent overcharge and overdischarge effectively and thus, to give the highly reliable assembled battery higher in energy density.

This application is based on Japanese Patent Application No. 2006-009504 filed on Jan. 18, 2006, the contents of which are hereby incorporated by reference.

Although the present invention has been fully described by way of example with reference to the accompanying drawing, it is understood that various changes and modifications will be apparent to those skilled in the art. Therefore, unless otherwise such changes and modifications depart from the scope of the present invention hereinafter defined, they should be construed as being included therein.

What is claimed is:

1. An assembled battery, comprising mainly multiple non-aqueous secondary cells A and at least one electric device B for voltage detection containing a non-aqueous electrolyte connected to the multiple non-aqueous secondary cells A in series, wherein, when a difference in the non-aqueous secondary cell A between a voltage per cell ($V_{A1}$) at a depth of discharge of 25% and a voltage per cell ($V_{A2}$) at a depth of discharge of 75% is designated as $\Delta V_A$, and a difference in the electric device B between a voltage per cell ($V_{B1}$) at a depth of discharge equivalent to the depth of discharge of 25% of the non-aqueous secondary cell A and a voltage per cell ($V_{B2}$) at a depth of discharge equivalent to the depth of discharge of 75% of the non-aqueous secondary cell A, as $\Delta V_B$, the $\Delta V_B$ of electric device B is greater than the $\Delta V_A$ of non-aqueous secondary cell A, a battery capacity per cell ($C_B$) of the electric device B is greater than a battery capacity per cell ($C_A$) of the non-aqueous secondary cell A, and the electric device B is a non-aqueous secondary cell.

2. The assembled battery according to claim 1, wherein the electric device B is an electric double-layer capacitor.

3. The assembled battery according to claim 1, wherein a negative electrode of the non-aqueous secondary cell A contains a graphite-based carbon material as a negative-electrode active material, and a negative electrode of the electric device B contains at least one material selected from amorphous carbon, alloys and metal oxides as a negative-electrode active material.

4. The assembled battery according to claim 1, wherein a positive electrode of the non-aqueous secondary cell A contains at least one compound selected from iron phosphate compounds and nickel manganese spinel oxides as a positive-electrode active material, and a positive electrode of the electric device B contains a lithium oxide represented by $LiMO_2$ (where M represents at least one metal selected from the group consisting of Ni, Co, Mn, Al, and Mg) as a positive-electrode active material.

5. An assembled battery, comprising mainly multiple non-aqueous secondary cells A and at least one electric device D for internal-resistance detection containing a non-aqueous electrolyte connected to the multiple non-aqueous secondary cells A in series, wherein, when a difference in the non-aqueous secondary cell A between an internal resistance per cell ($R_{A1}$) at a depth of discharge of 25% and an internal resistance per cell ($R_{A2}$) at a depth of discharge of 75% is designated as $\Delta R_A$, and a difference in the electric device D between an internal resistance per cell ($R_{D1}$) at a depth of discharge equivalent to the depth of discharge of 25% of the non-aqueous secondary cell A and an internal resistance per cell ($R_{D2}$) at a depth of discharge equivalent to the depth of discharge of 75% of the non-aqueous secondary cell A, as $\Delta R_D$, the $\Delta R_D$ of electric device D is greater than the $\Delta R_A$ of non-aqueous secondary cell A, a battery capacity per cell ($C_D$) of the electric device D is greater than a battery capacity per cell ($C_A$) of the non-aqueous secondary cell A, and wherein the electric device D is a non-aqueous secondary cell.

6. The assembled battery according to claim 5, wherein a negative electrode of the non-aqueous secondary cell A contains a graphite-based carbon material as a negative-electrode active material, and a negative electrode of the electric device D contains at least one material selected from amorphous carbon, alloys and metal oxides as a negative-electrode active material.

7. The assembled battery according to claim 5, wherein a positive electrode of the non-aqueous secondary cell A contains at least one compound selected from iron phosphate compounds and nickel manganese spinel oxides as a positive-electrode active material, and a positive electrode of the electric device D contains a lithium oxide represented by $LiMO_2$ (where M represents at least one metal selected from the group consisting of Ni, Co, Mn, Al, and Mg) as a positive-electrode active material.

8. A power-supply system, comprising the assembled battery according to claim 1.

9. A power-supply system, comprising the assembled battery according to claim 5.

* * * * *